United States Patent
Betting et al.

(10) Patent No.: US 7,357,825 B2
(45) Date of Patent: Apr. 15, 2008

(54) CYCLONIC FLUID SEPARATOR WITH VORTEX GENERATOR IN INLET SECTION

(75) Inventors: Marco Betting, Rijswijk (NL);
Theodoor Van Holten, Delft (NL);
Bart Prast, Rijswijk (NL)

(73) Assignee: Shell Oil Company, Houston, TX (US)

( * ) Notice: Subject to any disclaimer, the term of this patent is extended or adjusted under 35 U.S.C. 154(b) by 313 days.

(21) Appl. No.: 10/492,734

(22) PCT Filed: Sep. 27, 2002

(86) PCT No.: PCT/EP02/10907

§ 371 (c)(1),
(2), (4) Date: Mar. 26, 2004

(87) PCT Pub. No.: WO03/029739

PCT Pub. Date: Apr. 10, 2003

(65) Prior Publication Data

US 2004/0262218 A1 Dec. 30, 2004

(30) Foreign Application Priority Data

Sep. 28, 2001 (EP) ................................ 01203692

(51) Int. Cl.
*B01D 53/24* (2006.01)
*F25J 3/06* (2006.01)

(52) U.S. Cl. ........................ 55/447; 55/459.1; 55/468; 55/DIG. 14; 210/512.1

(58) Field of Classification Search ............. 219/512.1; 210/787, 512.1; 55/447, 456, 459.1, 468, 55/DIG. 14; 96/389; 95/29
See application file for complete search history.

(56) References Cited

U.S. PATENT DOCUMENTS

| | | | |
|---|---|---|---|
| 3,670,479 A | 6/1972 | Tomlinson | |
| 3,961,923 A | 6/1976 | Rouhani | |
| 4,746,340 A | 5/1988 | Durre et al. | .................. 55/347 |
| 6,113,675 A | 9/2000 | Branstetter | |
| 6,372,019 B1 | 4/2002 | Alferov et al. | |

FOREIGN PATENT DOCUMENTS

DE                346939            1/1922

(Continued)

OTHER PUBLICATIONS

International Search Report dated Jan. 27, 2003.

(Continued)

*Primary Examiner*—David A Reifsnyder

(57) ABSTRACT

A cyclonic fluid separator of the type comprising a tubular throat portion in which a fluid mixture is accelerated to a subsonic or supersonic speed and thereby expanded and cooled down so that condensable components condense and/or solidify and then swirl into a diverging fluid outlet section that comprises an outer secondary outlet for condensables enriched fluid components and an inner primary outlet for condensables depleted fluid components comprises swirl imparting vanes that protrude from a central body that extends through at least part of an inlet section of the separator, wherein the central body has, at a location upstream of the throat portion, a larger outer width ($2R_{o\ max}$) than the smallest inner width ($2R_{n\ min}$) of the throat portion.

11 Claims, 1 Drawing Sheet

FOREIGN PATENT DOCUMENTS

| | | |
|---|---|---|
| EP | 0420503 | 4/1991 |
| GB | 901290 | 7/1962 |
| GB | 2035151 | 6/1980 |
| JP | 2017921 | 1/1990 |
| RU | 1768242 | 10/1992 |
| RU | 2108134 | 4/1998 |
| RU | 2167364 | 5/2001 |
| SU | 1386309 | 4/1988 |
| WO | 00/23757 | 4/2000 |

OTHER PUBLICATIONS

L. A. Bagirov, EA 005482, "Cyclonic Fluid Separator with Vortex Generator in Inlet Section", 0410145/EA, - Our Comments, 2 pages - Cover Letter 1 page (May 2007).

Opposition Filed Against the Russian text of the Patent EA 005482. (undated).

M. J. Judashkin et al., "Equipment for the Installation of Cleaning Gases and Ventilation", Klev 1. 1991.

A. A. Rusanov, "Reference book on Dust and Ash Collecting", Moscow 1975.

Robert H. Perry, "Perry's Chemical Engineers' Handbook", 7th ed., pp. 17-27-17-32. (1997).

CYCLONIC FLUID SEPARATOR WITH VORTEX GENERATOR IN INLET SECTION

FIELD OF THE INVENTION

The invention relates to a cyclonic fluid separator with a vortex generator located in an inlet section of the generator.

BACKGROUND OF THE INVENTION

Such cyclonic separators are known from Japanese patent No. 2017921, Russian patent No. 1768242, UK patent application No. 2035151 and PCT patent application WO 00/23757.

The known cyclonic fluid separators comprise a tubular throat portion in which the fluid stream is accelerated to a possibly supersonic speed and rapidly cooled down as a result of adiabatic expansion. The rapid cooling will cause condensation and/or solidification of condensables in the fluid stream into small droplets or particles. If the fluid stream is a natural gas stream emerging from a natural gas production well then the condensables may comprise water, hydrocarbon condensates, waxes and gas hydrates. These separators furthermore comprise an assembly of swirl imparting vanes in an inlet portion upstream of the throat portion, which vane or vanes are tilted or form a helix relative to a central axis of the throat portion to create a swirling motion of the fluid stream within the separator. The centrifugal forces exerted by the swirling motion on the fluid mixture will induce the relatively high density condensed and/or solidified condensables to swirl to the outer periphery of the interior of the throat portion and of a diverging outlet section whereas relatively low density gaseous components are concentrated near the central axis of the separator. The gaseous components are subsequently discharged from the separator through a primary central outlet conduit, whereas the condensates enriched fluid stream is discharged from the separator through a secondary outlet which is located at the outer circumference of the diverging outlet section.

A disadvantage of the known vortex generators in the inlet section of the separator is that the amount of rotation imposed on the fluid stream is limited, unless the blades of the vortex generator are oriented at a large angle relative to the central axis of the separator, in which case blades create a high flow restriction in the fluid stream.

SUMMARY OF THE INVENTION

The cyclonic fluid separator according to the invention thereto comprises:

a tubular throat portion which is arranged between a converging fluid inlet section and a diverging fluid outlet section that comprises an outer secondary outlet for condensables enriched fluid components and an inner primary outlet for condensables depleted fluid components; and a number of swirl imparting vanes for creating a swirling motion of the fluid within at least part of the separator, which vanes protrude from a central body that extends through at least part of the inlet section of the separator, wherein the central body has, at a location upstream of the throat portion, a larger outer width than the smallest inner width of the throat portion.

The arrangement of the swirl imparting vanes on a large diameter central body around which the fluid stream is induced to flow and subsequently guided into the relatively small diameter throat portion will enhance the speed of rotation of the fluid stream as a result of the phenomena of preservation of moment of momentum.

The shape of the blade plane can be either flat of curved.

It is preferred that the tubular throat portion and the outer surface of the central body are substantially co-axial to a central axis of the separator and the swirl imparting vanes protrude from the outer surface of the central body at or near an area where the central body has a larger outer width than other parts of the central body.

It is also preferred that the central body has a substantially circular, onion-like, shape and comprises upstream of the swirl imparting vanes a dome-shaped nose section of which the diameter gradually increases such that the degree of diameter increase gradually decreases in downstream direction, and the central body further comprises downstream of the swirl imparting vanes a tail section of which the diameter gradually decreases in downstream direction along at least part of the length of the tail section.

Preferably the degree of diameter decrease of the tail section of the central body varies in downstream direction such that the tail section has an intermediate section of which the degree of diameter decrease is smaller than the diameter decrease of adjacent parts of the tail section that are located upstream and downstream of the intermediate section. In such case the shape of the central body may be described as pear-shaped.

Suitably, the separator comprises a housing in which the central body is arranged such that an annulus is present between the inner surface of the housing and the outer surface of the central body. The width of the annulus may be designed such that cross-axial area of the annulus gradually decreases downstream of the swirl imparting vanes such that in use the fluid velocity in the annulus gradually increases and reaches a supersonic speed at a location downstream of the swirl imparting vanes. In such case the width of the annulus may vary such that at the prevailing pressure difference between the inlet section and the outlet section during normal operation of the separator the fluid flowing through the annulus reaches a supersonic velocity at or near the intermediate section of the tail section of the central body.

Suitably, the tail section may comprise an elongated substantially cylindrical downstream end, which extends substantially co-axial to the central axis through the throat portion and at least part of the diverging fluid outlet section of the separator. Said elongated downstream end may serve as a vortex finder which stabilises and centralises the vortex throughout a major part of the interior of the cyclonic separator. Optionally, a number of flow straightening vanes are mounted on the substantially cylindrical downstream end of the tail section of the central body at a location within the diverging outlet section of the separator, as to transfer tangential momentum in to static pressure increase.

BRIEF DESCRIPTION OF THE DRAWING

The invention will be described in more detail, by way of example, with reference to the accompanying drawing.

DETAILED DESCRIPTION OF THE INVENTION

Figure 1:
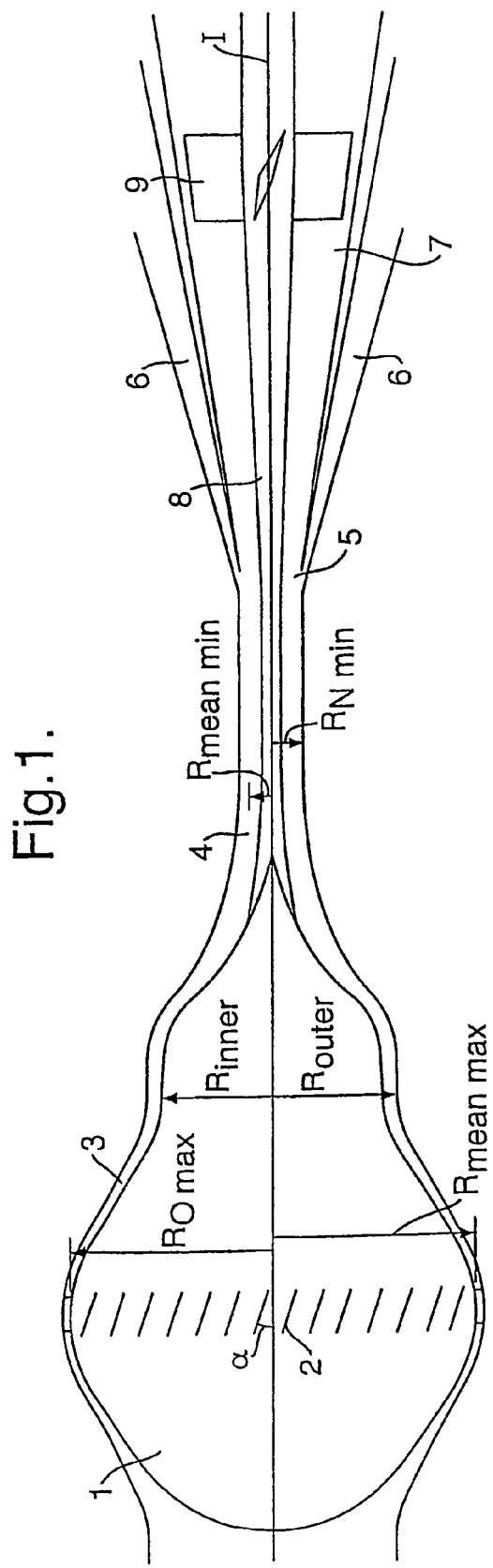
FIG. 1, which depicts a longitudinal sectional view of a cyclonic separator according to the invention.

Referring now to FIG. 1, there is shown a cyclonic inertia separator which comprises a swirl inlet device comprising a pear-shaped central body 1 on which a series of swirl imparting vanes 2 are mounted and which is arranged co-axial to a central axis I of the separator and inside the separator housing such that an annular flow path 3 is created between the central body 1 and separator housing. The separator further comprises a tubular throat portion 4 from which in use the swirling fluid stream is discharged into a diverging fluid separation chamber 5 which is equipped with a central primary outlet conduit 7 for gaseous components and with an outer secondary outlet conduit 6 for condensables enriched fluid components. The central body 1 has a substantially cylindrical elongate tail section 8 on which an assembly of flow straightening blades 9 is mounted. In accordance with the invention the central body 1 has a largest outer width or diameter 2 $R_{o\ max}$ which is larger than the smallest inner width or diameter 2 $R_{n\ min}$ of the tubular throat portion 4.

The functions of the various components of the cyclonic fluid separator according to the invention is as follows.

The swirl imparting vanes 2 which are oriented at an angle (α) relative to the central axis I create a circulation (Γ) in the fluid stream. It is preferred that a is between 20° and 30°. The fluid stream is subsequently induced to flow into the annular flow area 3. The cross-sectional surface of this area is defined as: $A_{annulus} = \pi \cdot (R_{outer}^2 - R_{inner}^2)$ The latter two being the outer radius and inner radius of the annulus at a selected location. The mean radius of the annulus at that location is defined as:

$$R_{mean} = \sqrt{[\tfrac{1}{2}(R_{outer}^2 + R_{inner}^2)]}$$

At the maximum value of the mean annulus radius $R_{mean,max}$ the fluid stream is flowing between the assembly of swirl imparting vanes 2 at a velocity (U), which vanes deflect the flow direction of the fluid stream proportional to the deflection angle (α) and so obtaining a tangential velocity component which equals $U_\phi = U \cdot \sin(\alpha)$ and an axial velocity component $U_x = U \cdot \cos(\alpha)$.

In the annular space 3 downstream of the swirl imparting vanes 2 the swirling fluid stream is expanded to high velocities, wherein the mean annulus radius is gradually decreasing from $R_{mean,max}$ to $R_{mean,min}$.

It is believed that during this annular expansion two processes occur:
(1) The heat or enthalpy in the flow (h) decreases with the amount $\Delta h = -\tfrac{1}{2} U^2$, thereby condensing those flow constituents which first reaching phase equilibrium. This results in a swirling mist flow containing small liquid or solid particles.
(2) The tangential velocity component increases inversely with the mean annulus radius $U_\phi$ substantially in accordance with the equation $U_{\phi,\ final} = U_{\phi,\ initial} \cdot (R_{mean,\ max}/R_{mean,\ min})$. This results in a strong increase of the centrifugal acceleration of the fluid particles ($a_c$), which will finally be in the order of:

$a_c = (U_{\phi,\ final}^2 / R_{mean,\ min})$.

In the tubular throat portion 4 the fluid stream may be induced to further expand to higher velocity or be kept at a substantially constant speed. In the first case condensation is ongoing and particles will gain mass. In the latter case condensation is about to stop after a defined relaxation time. In both cases the centrifugal action causes the particles to drift to the outer circumference of the flow area adjacent to the inner wall of the separator housing, which is called the separation area. The time period for the particles to drift to this outer circumference of the flow area determines the length of the tubular throat portion 4.

Downstream of the tubular throat portion 4 the condensables enriched 'wet' fluid components tend to concentrate adjacent to the inner surface of the diverging fluid separation chamber 5 and the 'dry' gaseous fluid components are concentrated at or near the central axis I, whereupon the wet condensables enriched 'wet' fluid components discharged into an outer secondary fluid outlet 6 via a series of slots, (micro)porous portions whereas the 'dry' gaseous components are discharged into the central primary fluid outlet conduit 7.

In the diverging primary fluid outlet conduit 7 the fluid stream is further decelerated so that the remaining kinetic energy is transformed into potential energy. The diverging primary outlet conduit is equipped with an assembly of flow straightening vanes 9 to recover the circulation energy.

While the illustrative embodiments of the invention have been described with particularity, it will be understood that various other modifications will be readily apparent to, and can be easily made by one skilled in the art without departing from the spirit of the invention. Accordingly, it is not intended that the scope of the following claims be limited to the examples and descriptions set forth herein but rather that the claims be construed as encompassing all features which would be treated as equivalents thereof by those skilled in the art to which this invention pertains.

We claim:

1. A cyclonic fluid separator comprising:
   a tubular throat portion which is arranged between a converging fluid inlet section and a diverging fluid outlet section that comprises an outer secondary outlet for condensables enriched fluid components and an inner primary outlet for condensables depleted fluid components; and
   a number of swirl imparting vanes for creating a swirling motion of the fluid within at least part of the separator, which vanes protrude from a central body having an inner surface and an outer surface; wherein the central body extends through at least part of the converging fluid inlet section of the separator, wherein the central body has, at a location upstream of the throat portion, a larger outer width than the smallest inner width of the throat portion.

2. The separator of claim 1, wherein the tubular throat portion and the outer surface of the central body are substantially coaxial to a central axis of the separator and the swirl imparting vanes protrude from the outer surface of the central body at or near the location upstream of the throat portion.

3. The separator of claim 2, wherein the central body has a substantial circular shape in a cross-axial direction and comprises upstream of the swirl imparting vanes a nose section of which the diameter gradually increases such that the degree of diameter increase gradually decreases in downstream direction, and the central body further comprises downstream of the swirl imparting vanes a tail section of which the diameter gradually decreases in downstream direction along at least part of the length of the tail section.

4. The separator of claim 3, wherein the degree of diameter decrease of the tail section of the central body varies in downstream direction such that the tail section has an intermediate section of which the degree of diameter decrease is smaller than the diameter decrease of adjacent parts of the tail section that are located upstream and downstream of the intermediate section.

5. The separator of claim 4, wherein the separator comprises a housing in which the central body is arranged such that an annulus is present between the inner surface of the housing and the outer surface of the central body.

6. The separator of claim 5, wherein the width of the annulus varies such that at the prevailing pressure difference between the inlet section and the outlet section during normal operation of the separator the fluid flowing through the annulus reaches a supersonic velocity at or near the intermediate section of the tail section of the central body.

7. The separator of claim 3, wherein the tail section comprises an elongated substantially cylindrical downstream end which extends substantially co-axial to the central axis through the throat portion and at least part of the diverging fluid outlet section of the separator.

8. The separator of claim 7, wherein a number of flow straightening vanes are mounted on the substantially cylindrical downstream end of the tail section of the central body at a location within the diverging outlet section of the separator downstream of the secondary outlet for liquid enriched fluid components.

9. The separator of claim 3, wherein the separator comprises a housing in which the central body is arranged such that an annulus is present between the inner surface of the housing and the outer surface of the central body.

10. The separator of claim 2, wherein the separator comprises a housing in which the central body is arranged such that an annulus is present between the inner surface of the housing and the outer surface of the central body.

11. The separator of claim 1, wherein the separator comprises a housing in which the central body is arranged such that an annulus is present between the inner surface of the housing and the outer surface of the central body.

* * * * *